US010601545B2

(12) United States Patent
Callard et al.

(10) Patent No.: US 10,601,545 B2
(45) Date of Patent: *Mar. 24, 2020

(54) SYSTEM AND METHOD FOR FORWARD ERROR CORRECTION (71) Applicant: Huawei Technologies Co., Ltd., Shenzhen (CN)

(72) Inventors: Aaron James Callard, Ottawa (CA); Alex Stephenne, Stittsville (CA); Mohammadhadi Baligh, Ottawa (CA); Kelvin Kar Kin Au, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 95 days.

This patent is subject to a terminal disclaimer.

(21) Appl. No.: 15/890,746

(22) Filed: Feb. 7, 2018

(65) Prior Publication Data
US 2019/0052399 A1  Feb. 14, 2019

Related U.S. Application Data (63) Continuation of application No. 14/732,074, filed on Jun. 5, 2015, now Pat. No. 9,923,665.
(Continued)

(51) Int. Cl.
H04L 1/00  (2006.01)
H04L 1/18  (2006.01)
H04W 28/04  (2009.01)

(52) U.S. Cl.
CPC .......... *H04L 1/0041* (2013.01); *H04L 1/004* (2013.01); *H04L 1/0045* (2013.01);
(Continued)

(58) Field of Classification Search
CPC ..................................... H04L 1/0057
(Continued)

(56) References Cited

U.S. PATENT DOCUMENTS 5,745,532 A  4/1998  Campana, Jr.
6,272,190 B1  8/2001  Campana, Jr.
(Continued)

FOREIGN PATENT DOCUMENTS

CN  102055782 A  5/2011
CN  103378953 A  10/2013
(Continued)

OTHER PUBLICATIONS

Soljanin, E. et al., "Incremental Redundancy Hybrid ARQ with LDPC and Raptor Codes," Draft, Submitted to the IEEE Transactions on Information Theory, Sep. 8, 2005, 37 pgs.
(Continued)

*Primary Examiner* — Fritz Alphonse
(74) *Attorney, Agent, or Firm* — Slater Matsil, LLP (57) ABSTRACT A method includes receiving, by a first device from a second device, a plurality of encoded messages on a plurality of transmission time intervals (TTIs), where the plurality of encoded messages are forward error correction (FEC) encoded, and where the FEC spans the plurality of encoded messages and decoding the plurality of encoded messages using FEC. The method also includes determining a plurality of decoding status messages in accordance with decoding the plurality of encoded messages and transmitting, by the first device to the second device, the plurality of decoding status messages less often than once every TTI.

24 Claims, 8 Drawing Sheets

Related U.S. Application Data (60) Provisional application No. 62/008,971, filed on Jun. 6, 2014.

(52) U.S. Cl.
CPC .......... *H04L 1/1848* (2013.01); *H04L 1/1854* (2013.01); *H04W 28/04* (2013.01); *H04L 1/1812* (2013.01)

(58) Field of Classification Search
USPC .......................................... 714/776, 788, 775
See application file for complete search history.

(56) References Cited

U.S. PATENT DOCUMENTS

| 8,160,056 | B2 | 4/2012 | Van der Merwe et al. |
| 9,320,003 | B2 | 4/2016 | Jin |
| 9,923,665 | B2 * | 3/2018 | Callard ................. H04W 28/04 |
| 2006/0184456 | A1 | 8/2006 | De Janasz |
| 2008/0137604 | A1 | 6/2008 | Lee |
| 2013/0077579 | A1 * | 3/2013 | Cho ........................ H04W 4/70 370/329 |
| 2013/0282438 | A1 | 10/2013 | Hunter et al. |
| 2014/0133656 | A1 | 5/2014 | Wurster et al. |
| 2014/0269253 | A1 * | 9/2014 | Cho ........................ H04W 8/24 370/217 |
| 2014/0269626 | A1 * | 9/2014 | Cho ...................... H04L 1/1893 370/335 |

FOREIGN PATENT DOCUMENTS

| EP | 2061174 A1 | 5/2009 |
| WO | 2010112963 A1 | 10/2010 |

OTHER PUBLICATIONS

Soljanin, E. et al., "Punctured vs Rateless Codes for Hybrid ARQ," IEEE Information Theory Workshop, Mar. 13-17, 2006, 5 pgs.

* cited by examiner

SYSTEM AND METHOD FOR FORWARD ERROR CORRECTION

CROSS-REFERENCE TO RELATED APPLICATIONS

This application is a continuation of U.S. patent application Ser. No. 14/732,074, filed on Jun. 5, 2015, and entitled "System and Method for Forward Error Correction," which claims the benefit of U.S. Provisional Application No. 62/008,971, filed on Jun. 6, 2014, and entitled "System and Method for ACK-less HARQ," which applications are hereby incorporated herein by reference.

TECHNICAL FIELD

The present invention relates to a system and method for wireless communications, and, in particular, to a system and method for forward error correction.

BACKGROUND

Forward error correction (FEC) is a technique for controlling errors in data transmission over unreliable or noisy communication channels, such as wireless communications channels. In FEC, a transmitter redundantly encodes a message using an error-correcting code (ECC). The receiver may then detect errors using the redundancy. FEC techniques include convolution codes, block codes, concatenation codes, turbo codes, fountain codes, low density parity-check (LDPC) codes, and polar codes.

SUMMARY

An embodiment method includes receiving, by a first device from a second device, a plurality of encoded messages on a plurality of transmission time intervals (TTIs), where the plurality of encoded messages are forward error correction (FEC) encoded, and where the FEC spans the plurality of encoded messages and decoding the plurality of encoded messages using FEC. The method also includes determining a plurality of decoding status messages in accordance with decoding the plurality of encoded messages and transmitting, by the first device to the second device, the plurality of decoding status messages less often than once every TTI.

An embodiment method includes forward error correction (FEC) encoding a plurality of messages to produce a first plurality of encoded messages, where the FEC spans the first plurality of encoded messages and transmitting, by a first device to a second device, the first plurality of encoded messages. The method also includes receiving, by the first device from the second device, a plurality of decoding status messages in accordance with the first plurality of encoded messages, where the plurality of decoding status messages is received less often than once every TTI.

An embodiment first device includes a processor and a non-transitory computer readable storage medium storing programming for execution by the processor. The programming includes instructions to receive, from a second device, a plurality of encoded messages on a plurality of transmission time intervals (TTIs), where the plurality of encoded messages are forward error correction (FEC) encoded, and where the FEC spans the plurality of encoded messages and decode the plurality of encoded messages using FEC. The programming also includes instructions to determine a plurality of decoding status messages in accordance with decoding the plurality of encoded messages and transmit, to the second device, the plurality of decoding status messages less often than once every TTI.

An embodiment first device includes a processor and a non-transitory computer readable storage medium storing programming for execution by the processor. The programming includes instructions forward error correction (FEC) encode a plurality of messages to produce a plurality of encoded messages, where the FEC spans the plurality of encoded messages and transmit, to a second device, the plurality of encoded messages. The programming also includes instructions to receive, from the second device, a plurality of decoding status messages in accordance with the plurality of encoded messages, where the plurality of decoding status messages is received less often than once every TTI.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

In automatic repeat request (ARQ) schemes, frame errors are examined at a receiver using an error detecting code, for example a cyclic redundancy check (CRC) code. When a frame passes the error check, the receiver transmits an acknowledgment (ACK) of successful transmission to the transmitter. On the other hand, when the frame does not pass the error check, the receiver transmits a negative acknowledgement (NACK) requesting retransmission of the frame. Error correcting codes may be used along with error detection, increasing the probability of successful transmission. An error scheme which uses both ARQ and error correction coding is referred to as hybrid ARQ (HARQ).

FEC techniques include convolution codes, block codes, concatenation codes, turbo codes, fountain Codes, and other codes, such as polar codes. Convolution codes work on streams of bits or symbols having an arbitrary length. Convolution codes may be soft decoded with the Viterbi algorithm or another soft decoding algorithm. A convolution code which is terminated is also a block code. Terminated convolution codes include tail-biting and bit-flushing codes. Block codes operate on fixed size blocks, or packets, of bits or symbols having a predetermined size. Block codes may be hard-determined in polynomial time to their block length. Block codes include classical block codes or modern block codes. Classical block codes include Reed-Solomon coding, Golay coding, Bose Chauduri Hocquengham (BCH) coding, multi-dimensional parity coding, and Hamming coding. Modern block codes include low-density parity check (LDPC) coding. LDPC codes are highly efficient linear block codes made from many single parity check (SPC) codes. Concatenated codes incorporate both a classical block coding and a convolution coding. Turbo coding is an iterated soft-decoding scheme which combines two or more convolution codes and an interleaver to produce a block code. Rateless Fountain Codes include LT codes. The code words of an LT code are generated based on k information symbols based on a probability distribution on the numbers 1, . . . , k. Each codeword symbol is obtained independently, by first sampling the distribution to obtain a number d, and adding the values of d randomly chosen information symbols. Raptor codes are a modified version of LT codes, where the information sequence of k symbols is pre-coded by a high rate block code, and n symbols are used to generate the Raptor codeword symbols as in LD codes. A polar code is a linear block error correcting code.

An embodiment provides ACK-less HARQ. In one embodiment, information bits are mixed into subsequent transmissions, so extra capacity of the subsequent transmissions may be used to recover from a loss. In an embodiment, FEC spans multiple scheduling instances, and is used before an ACK or NACK is received, by using soft data to decode the values. An embodiment FEC has a block upper triangular parity check matrix, where the blocks correspond to different scheduling instances. An embodiment uses fountain codes. In an embodiment, good performance is achieved with low delay and high performance. An embodiment has low loss from quantization, because the quantization of parity bits is over large blocks, reducing the impact of the quantization. An embodiment has a high throughput due to resilience to modulation and coding scheme (MCS) adaptation error. An embodiment provides a low average packet delay, because it is highly likely that a packet error will be correctly decoding in the next transmission time interval (TTI), rather than waiting for a round trip of NACK/retransmission (8 ms in Long Term Evolution (LTE)) later after a HARQ. Also, fewer resources may be used due to not transmitting a HARQ.

An embodiment performs FEC encoding to produce a stream which is stream decodable. A stream decodable stream can be decoded to recover a subset of the entire information stream. Also, in a stream decodable stream, all information and parity bits are functions of information or parity bits which are strictly before that point in the stream.

Figure 1:
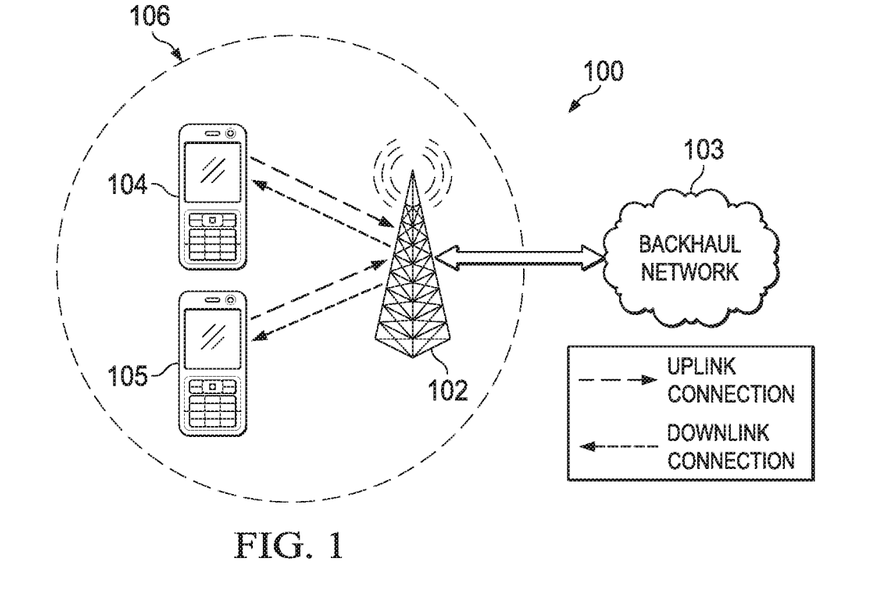
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Communications controller 102 may provide voice and/or data wireless communication service to UEs 104 and 105. Network 100 may be an LTE network, LTE-advanced (LTE-A) network, or another type of network. Two UEs are depicted, but many more may be present. Communications controller 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, relay node, and other wirelessly enabled devices. Communications controller 102 may have a scheduler for allocated radio resources to the UEs. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc. Coverage area 106 represents the range of communications controller 102 to adequately transmit data. There may be multiple coverage areas corresponding to multiple communications coverage, which may have some overlap for handoffs between the communications controllers when a UE exits one coverage area and enters another coverage area. FEC may be used in communications in network 100.

In one example, in a first transmission, data for FEC=D_1 is transmitted for systematic code D_1 P_1. Then, in a second transmission, the data for FEC=[D_1 D_2] is transmitted for systematic code D_2 P_2, where P_2 is a function of both D_1 and D_2. When the data in the first transmission is correctly decoded, there is no loss in the decoding of the second transmission. When the first transmission is incorrectly decoded, P_2 may be used to help decode the first transmission. P_2 may also be used to decode the second transmission. There may be a greater chance of failing to decode the second transmission than of failing to decode the first transmission.

Embodiments may use different ACK/NACK message configurations. For example, an ACK/NACK may be transmitted less often than once every TTI. That is, the ACK/NACK is transmitted on a subset of TTIs. For example, the ACK/NACK may be transmitted every five, ten, fifteen, or twenty frames. In another example, a NACK is transmitted when there is a problem, for example only when there is an error which cannot be corrected, and ACKs are not transmitted.

The amount of new data may be known by the receiver to facilitate understanding the parity bits. Zero new information bits may be an example transmission choice with respect to ACK/NACK. In an example, received data is kept in a buffer to allow for fluctuations in the signal-to-noise ratio (SNR). Successful decoding may be performed on the present transmission, at a later time, or not at all.

Fully mixing the parity bits with the old data may lead to high effective code rates, where the code is unlikely to converge. A set fraction of the parity bits may be mixed with the old data to prevent convergence problems.

In one example, resource assignment is separated from FEC. Thus, one FEC spans several resource assignments. In another example, the FEC code is spread out over multiple TTIs. In an example, the FEC code is spread over multiple transmissions of the same user. In another example, the FEC code is spread over data of multiple users. This may be used when each user only has a small amount of data to transmit infrequently, but there are sufficient users that the aggregate traffic transmission occurs frequently. On the uplink, UE cooperation may facilitate the mixing of user data in subsequent transmission.

In an embodiment ACK/NACK are transmitted as normal.

In another embodiment, a block ACK/NACK is transmitted periodically. The ACK indicates that so far, decoding has been successful, up to a known point. A NACK may indicate that there is an error in a set of transmissions, or in a particular transmission.

In an additional embodiment, the transmitter assumes that the decoding has been successful, unless a channel quality indicator (CQI) is received, which indicates a reduction in channel quality which is likely to have caused errors. The transmitter may then adjust the long term amount of new information bits added (rate), as well as temporarily adjust the rate to retroactively adjust the MCS in previous transmissions.

An embodiment uses a fountain code on top of a HARQ process with a hard limitation on the number of transmission, which reduces the energy lost from a lack of soft combining. The residual error rate may be small, or errors may occur when the received signal is very low.

In an example, multiple FECs are acknowledged with a single ACK/NACK. Turbo codes may be used to achieve parallel turbo coding and ACK-less transmission. The turbo code output includes systematic bits, non-interleaved parity bits, and interleaved parity bits. The new packet to be combined with the first transmission to be used to update the three components. The systematic bits of the new combined packet may be produced by appending the systematic bits from the first and second packets. In one example, the bits remain the same, except for the bits for trellis endings. When the two streams are appended, the non-interleaved parity bits are the non-interleaved parity bits of the first and second bits as appended. Tail ending bits may receive different treatments.

In one example, zero-state concatenation is used. The tail-ending systematic bits of the first packet are intact. The second stream may thus start with a zero-state. A new set of tail-ending bits are added to the end of the second stream. From the point of view of the decoder, there is one stream with the zero state, both at the beginning and the end of the stream, and also one in the middle of the stream, where the two packets are appended. This extra information may be used by the decoder. Alternatively, this extra information is not used by the decoder. When a turbo code component code with a memory length of three is used, such as in long term evolution (LTE), the information may add up to three bits of information, which may be ignored when the block length is much bigger than three.

In another example, non-zero state concatenation is used. The tail ending bits of the first packet are ignored, and the second packet starts from the continuation of the first packet end state. A new set of bits may be used to end the state of the new packet. The information of the tail-ending bits and their associated parity bits may add up to six bits of information, which the receiver may use in decoding. Alternatively, the receiver does not use the tail-ending bits and the parity bits.

For interleaved parity bits, the interleaver for the combined packet mixes the two streams. The new stream functions as both the old stream and the new stream. The original interleaved parity streams looks as though it has gone through an interleaver which does not mix the first and the second part of the combined stream. The interleaver matrix for the first data stream is block diagonal. The parity bits in the second part of the stream are punctured with no trace of the second packet in the first transmission. As in the non-interleaved case, the tail ending bits may or may not be used by the decoder.

The combined parity stream after interleaving may have a total length of the sum of both packets. To reduce the length of the interleaved parity stream, the parity bits may be punctured in the bit positions corresponding to the bits from the first packet.

In one example, the final code is similar to a turbo code which has three component codes and four streams. Systematic bits, not including the tail ending bits, are formed by concatenating the two packets, which have a length of N1+N2, where N1 and N2 are the lengths of the original packets. Non-interleaved parity bits, which are a concatenation of the two non-interleaved bit streams, have a size of N1+N2. Interleaved parity stream 1, which has a size N1, uses a block diagonal interleaver which punctures all of the bits corresponding to the positions of the second packet. Interleaved parity stream 2 has an interleave which mixes both streams to a size of N1+N2 when all of the bits of the parity bits are considered, a size N2 when the parity bits corresponding to the first part of the packet are punctured, and a size between N2 and N1+N2 when the bits are partially punctured. This code is effectively a mother turbo code having a rate of between:

$$\frac{N1+N2}{4N1+3N2}$$

and ⅓, depending on the level of puncturing. A turbo code with three component codes and two interleavers may be decoded similarly to when one interleaver is used. More component codes and more interleavers may be used when more packets are merged.

In another example, polar codes are used for ACK-less transmission. Polar codes have mother generator and parity check matrices which are triangular. The frozen bits for the first packet may be selected in accordance with the submatrix which contains only the first transmitted packet. In this case, the bits are not necessarily the optimal bits to be frozen when the two codes are combined, but there is a strong correlation, i.e. a bit which is likely to be frozen in the first half of the code after concatenating the two packets is also more likely to be frozen without concatenation. Also, the generator matrix increases the strength of the bits from the first packet. Also, for very large packets, successive decoding may be used. In one example, for each packet, the weight of the bit is considered solely based on the current packet, and not based on the generator matrix associated with the current and upcoming packets. This may have a low misdetection rate for the original packets. Alternatively, the frozen bits are selected in the first and second packets based on the overall generator matrix.

An example using LDPC is used to evaluate performance of a method of FEC. The parity check matrix is block triangular. The interaction between the blocks is regulated by limiting the number of 1s in the off diagonal block area. When there are no 1s off of the diagonal block area, the blocks are independent. A normal matrix for LDPC may be used. In one example, a parity matrix with a rate of ½ is used. The simulation parameters include a maximum number of iterations of eight, and quadrature phase shift keying (QPSK) modulation.

Figure 2:
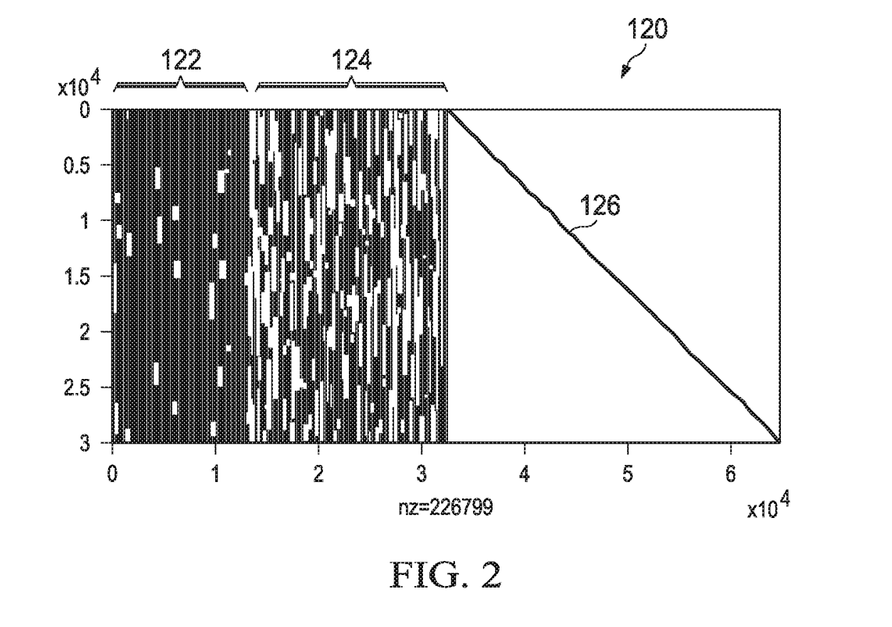
FIG. 2 illustrates an embodiment parity matrix.

FIG. 2 illustrates parity matrix 120 with 10% overlap. Black dots indicate the presence of a non-zero value (e.g. 1) in the sparse parity matrix. Region 122 shows information bits, and region 124 show parity bits, which depend on the information bits in region 122. The parity bits may apply to multiple codewords. Line 126 represents a particular form of LDPC parity check matrix, where the second half of the parity check matrix equals the identity matrix.

Figure 3:
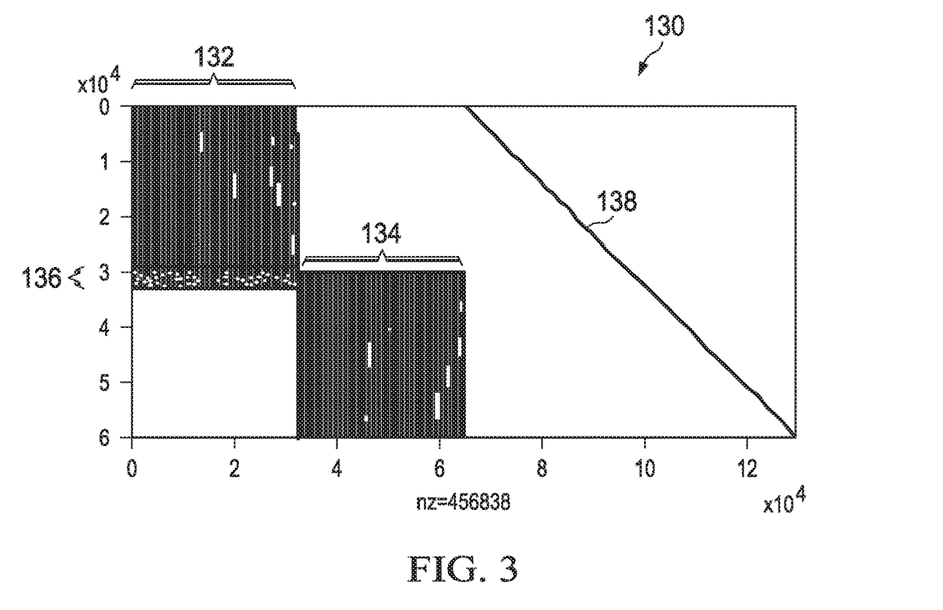
FIG. 3 illustrates another embodiment parity matrix.

FIG. 3 illustrates parity matrix 130 with 10% overlap with a second transmission. Region 132 shows the first transmission, region 134 shows the second transmission, and region 136 is the overlap region, which contains parity bits which are functions of both transmissions. Parity matrix 130 is a very sparse matrix which is block diagonal. Line 138 represents a particular form of LDPC parity check matrix, where the second half of the parity check matrix equals the identity matrix.

Figure 4:
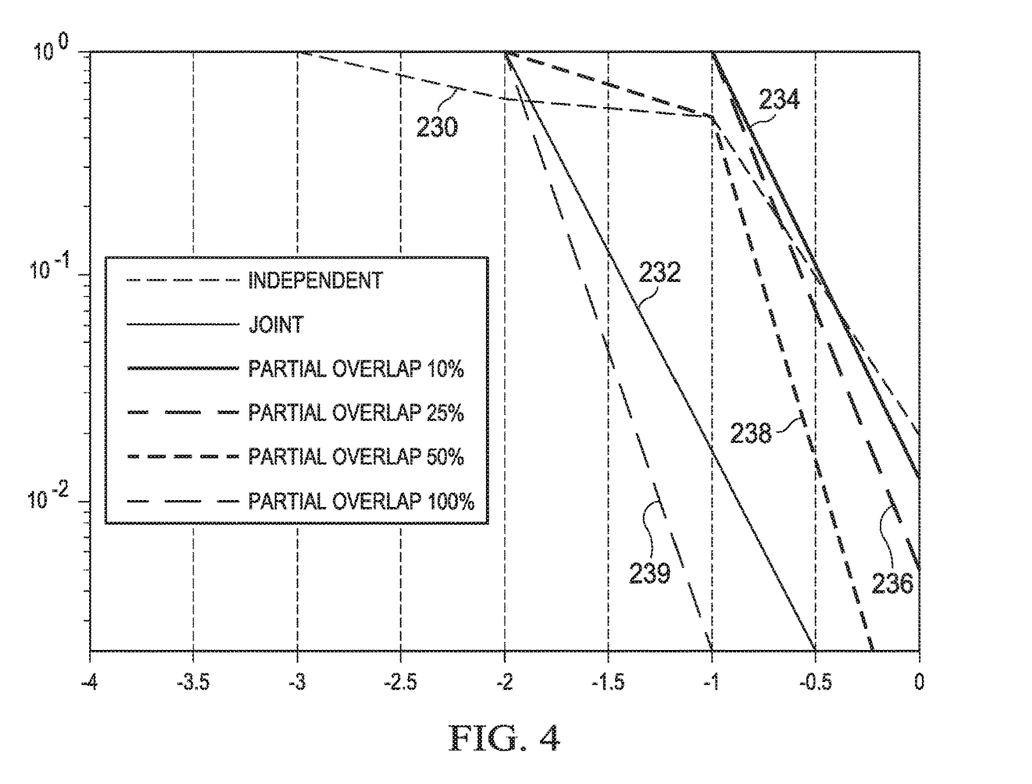
FIG. 4 illustrates a graph of block error rate (BLER) for different levels of overlap.

FIG. 4 illustrates the link level block error rate (BLER) for different levels of overlap. Curve 230 shows independent matrixes, curve 232 shows joint matrices, curve 234 shows 10% overlap, curve 236 shows 25% overlap, curve 238 shows 50% overlap, and curve 239 shows 100% overlap.

Figure 5:
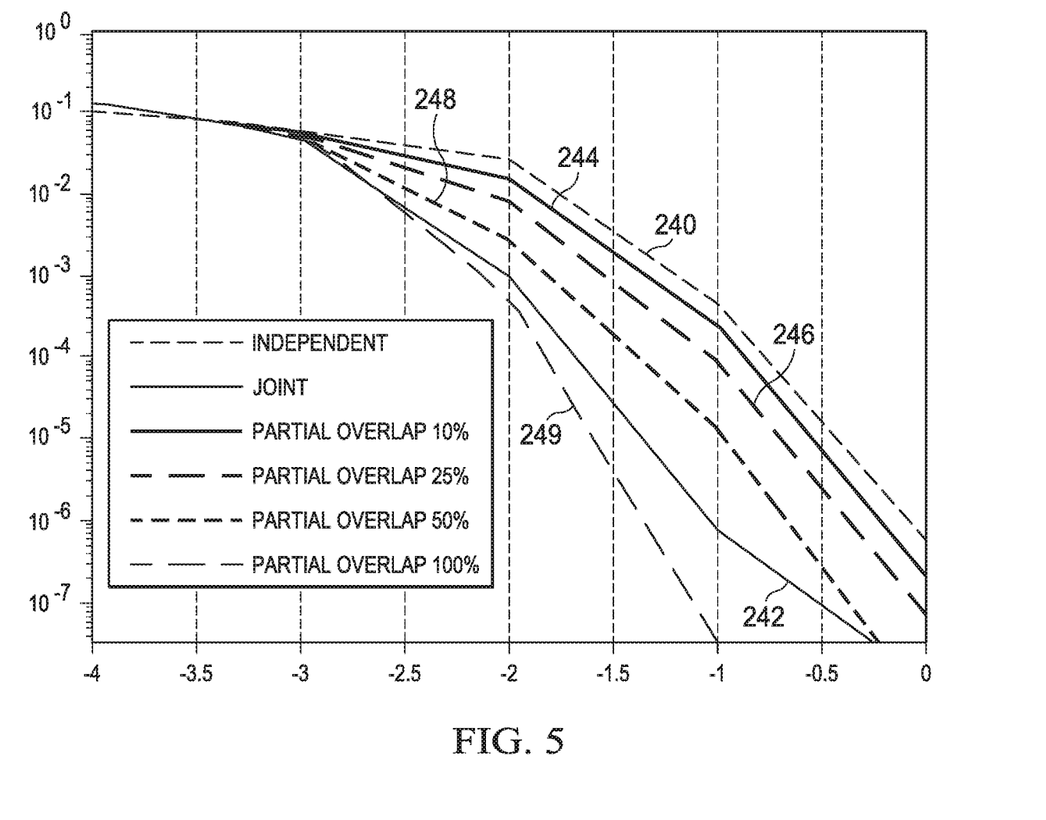
FIG. 5 illustrates a graph of bit error rate (BER) for different levels of overlap.

FIG. 5 illustrates the bit error rate (BER) performance for different levels of overlap. Curve 240 shows independent matrixes, curve 242 shows joint matrices, curve 244 shows 10% overlap, curve 246 shows 25% overlap, curve 248 shows 50% overlap, and curve 249 shows 100% overlap.

To evaluate performance at the system level, a perfect FEC code and an unquantized rate adaptation are used. At each transmission, the SNR prediction is used to determine the rate of transmission and the SNR for the capacity of the channel. When the rate of transmission is less than the capacity, the transmission is considered successful, and when the rate of transmission is greater than the capacity, the transmission is considered to be an error. For baseline retransmission, when there is an error, a transmission 8 ms later is a HARQ, and the capacity of the channels are added together and compared to the information in the first transmission. The delay is the time from the first transmission to successful reception. For a higher throughput, the information and capacities are added together every TTI. When the capacity is greater than the information, it is assumed to be decoded, the information and capacities are set to zero. When the transmission is successful, the delay is set to the length from the first error to the successful TTI. Because no HARQs are transmitted, there is a higher throughput than the baseline. For an embodiment with the same throughput, to balance the lack of HARQ, the amount of information bits transmitted is reduced by 5%. For fountain coding, a scheme similar to that using higher throughput is used, and when a packet is in error, the capacity is set to zero. The information bits are reduced by 10%, representing a 10% erasure protection.

Figure 6:
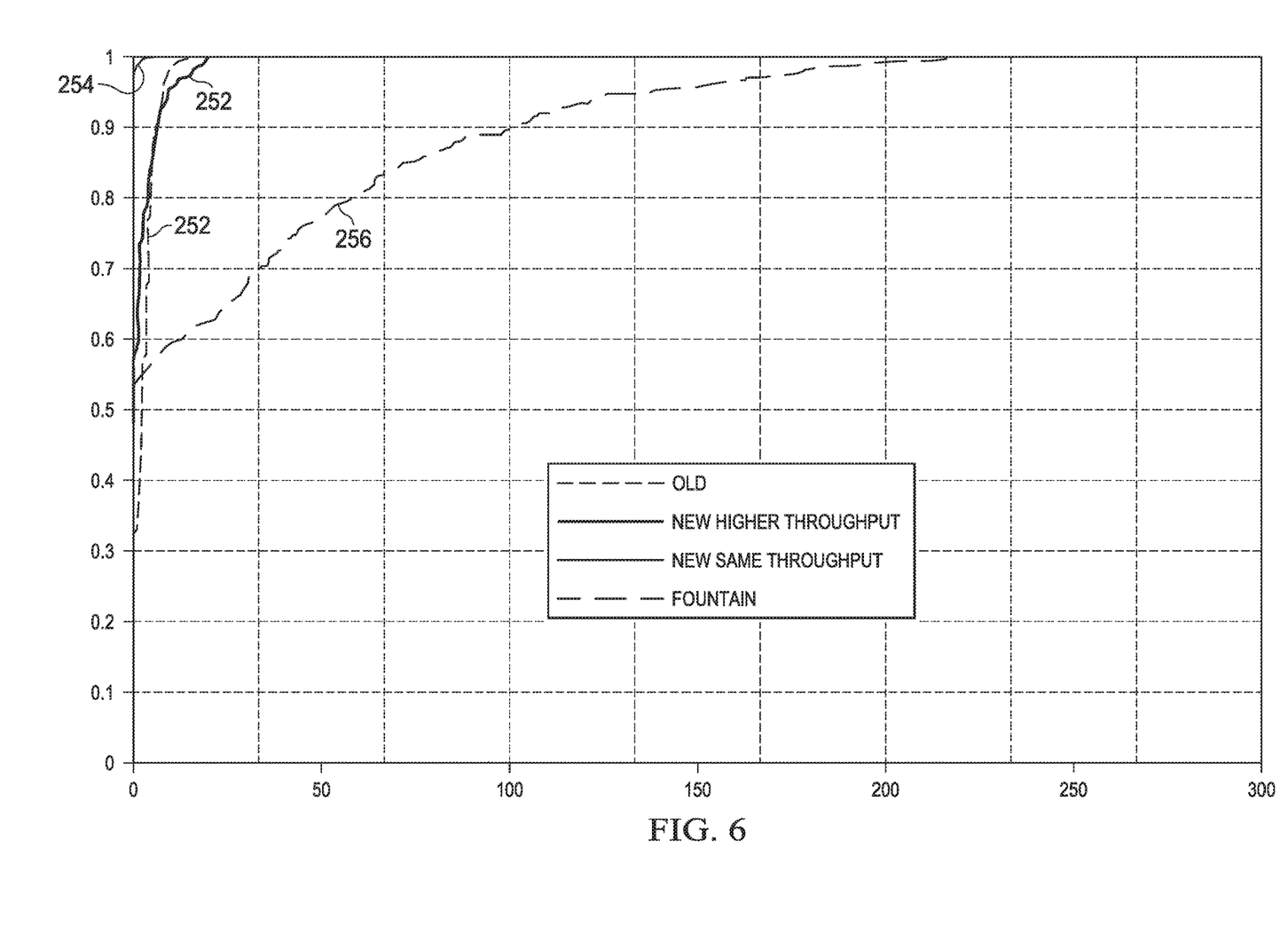
FIG. 6 illustrates a graph of average delay per user for different forward error correction (FEC) techniques.

FIG. 6 illustrates a graph of average delay per user. Curve 250 shows a method using HARQ, curve 252 shows a method with a higher throughput, curve 254 shows a method for the same throughput, and curve 256 shows a method using a fountain code.

Figure 7:
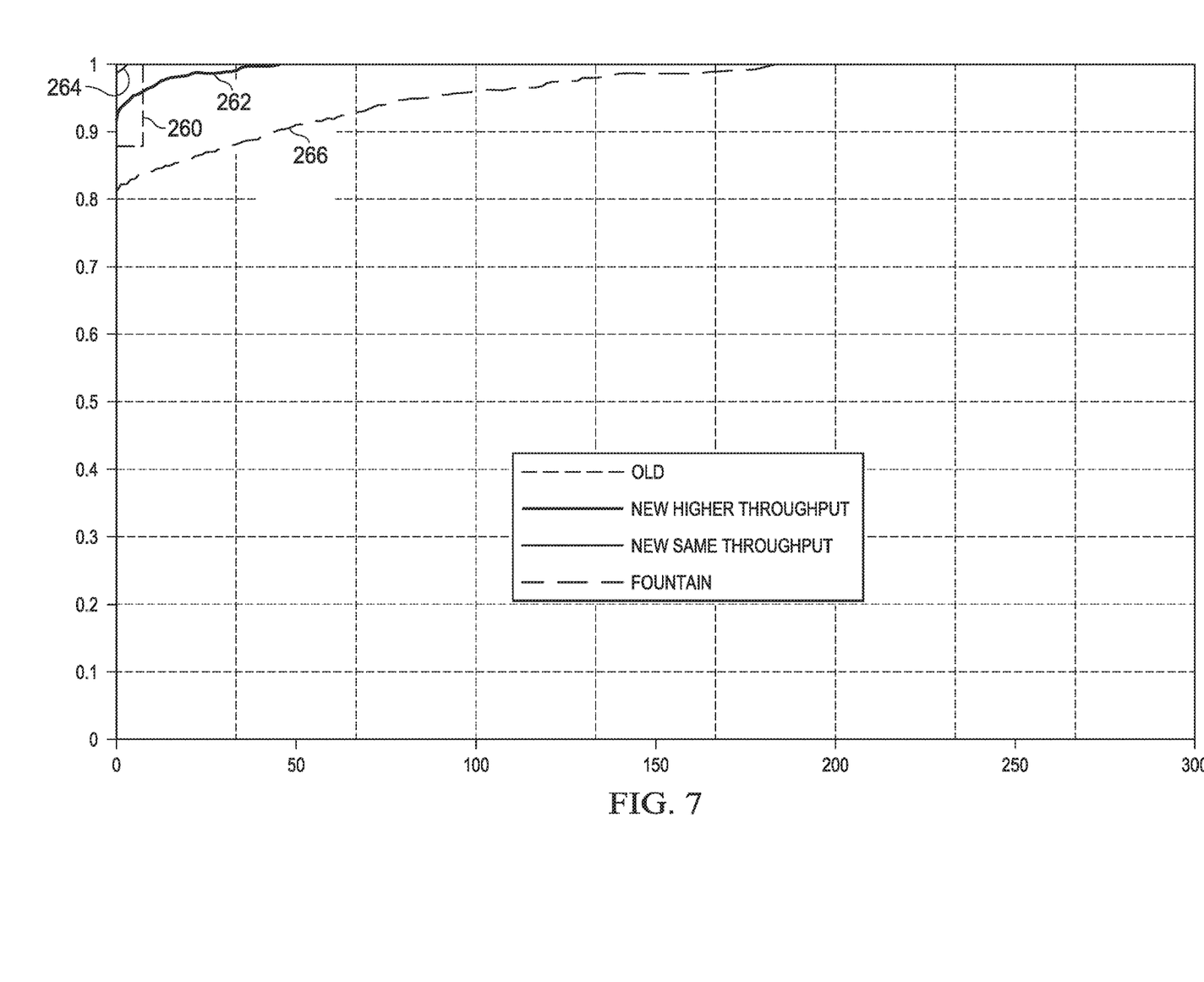
FIG. 7 illustrates a graph of average delay per transmission for different FEC techniques.

FIG. 7 illustrates a graph of the average delay per transmission. Curve 260 shows a method using HARQ, curve 262 shows a method with a higher throughput, curve 264 shows a method for the same throughput, and curve 266 shows a method using a fountain code.

Figure 8:
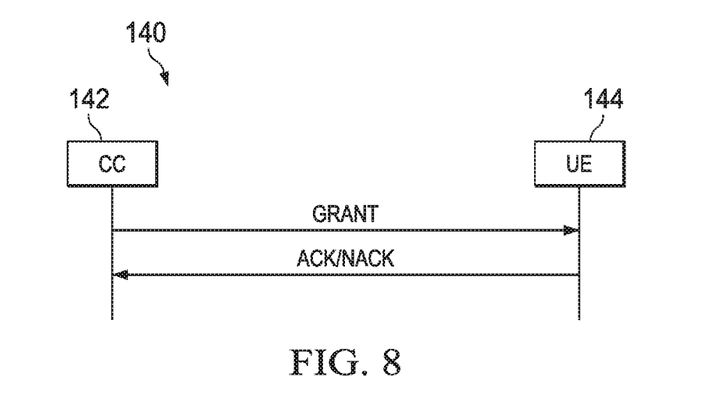
FIG. 8 illustrates a message diagram for an embodiment method of FEC.

In one example, ACKs and NACKs are transmitted. After every transmission, the UE responds with an ACK/NACK. FIG. 8 illustrates message diagram 140. Communications controller (CC) 142 transmits a grant message to UE 144.

In response, UE 144 transmits an ACK when the grant message has been successfully decoded, or a NACK when the grant has not been successfully decoded. When communications controller 142 receives an ACK or NACK, it may behave in several manners. The transmitter may apply long term MCS adaptation, and decrease the effective rate of transmission to the UE when a NACK is received. In another example, the communications controller applies a short term decrease in the transmission rate to improve this particular error condition. In an additional example, the transmitter applies long term MCS adaptation and the communications controller applies a short term decrease in the transmission rate. When FEC encoding is used, information from fewer transmissions (i.e. only the last 4) may be use. A HARQ like process may be performed to recover the data. In one example, the encoding combines at most three transmissions. Table 1, below shows an example of ACK/NACK messaging.

TABLE 1

| Response | ACK | ACK | ACK | ACK | NACK | NACK | NACK | NACK | ACK | ACK | ACK |
|---|---|---|---|---|---|---|---|---|---|---|---|
| Time | 1 | 2 | 3 | 4 | 5 | 6 | 7 | 8 | 9 | 10 | 11 |

Depending on the feedback time of the messages, it may be too late to recover naturally. Additional parity bits of undecoded information may be requested to aid in recovery. For example, 5-8 additional parity bits may be requested. In one example, additional parity bits from one of the original mother codes are transmitted. Alternatively, a new code based on all three transmission blocks is generated, and those parity bits are considered.

There is a tradeoff between complexity (i.e. FEC block size) and performance or reaction time. Several streams may be simultaneously present, with transmissions applying to different streams, either through explicit signaling (HARQ index) or based on transmission, for example every TTI.

The grant message may include a variety of fields. The grant may include a quadrature amplitude modulation (QAM) field, which may be separate from the code rate. Alternatively, the QAM field includes the code rate. The grant message may also include the amount of new data transmitted and the amount of redundant data. The mother code block size may be interpreted from the QAM field and the amount of assigned resources. A reference to the decoding position in the mother code may be included in the grant message. Also, the stream being used may be included in the grant message. Multiple concurrent decoding streams may be used when different quality of service (QoS) data is present, where the multiple streams represent different FEC blocks which are not encoded together. The grant message may include the mother code configuration, which may be used to recover from control channel loss in which the mother code from previous transmissions cannot be reconstructed. This reconstruction may be aided by semi-static signaling and dynamic configuration. The code rate or QAM may be set semi-statically. Also, a counter indicating control channel may be transmitted on the grant transmission. When HARQ messaging is used, additional information, such as which TTI or control grant the transmission corresponds to, or which stream position the transmission corresponds to.

In another embodiment, the receiver transmits a response only when it cannot recover the data from the transmissions. For example, a response may be retransmitted when the parity bits no longer refer to a particular block of data.

Figure 9:
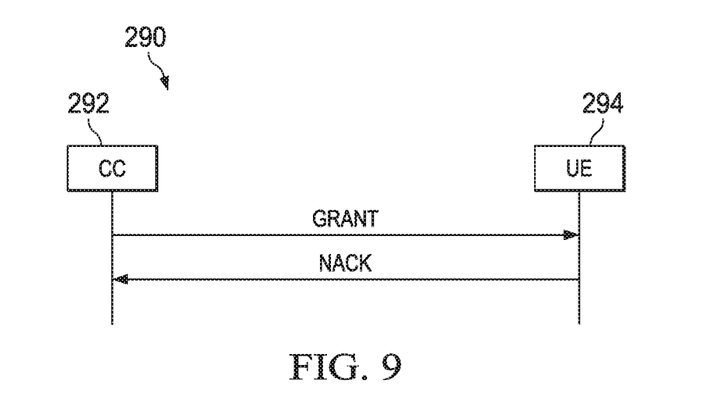
FIG. 9 illustrates a message diagram for another embodiment method of FEC.

FIG. 9 illustrates message diagram 290 for a method of FEC. Communications controller 292 transmits a grant message to UE 294. In response, UE 294 transmits a NACK message only when it cannot automatically recover the data. The NACK may be transmitted through a random access channel, because the NACK is rarely transmitted. The contents of the NACK may be more detailed than a single bit for success or failure for the transmission.

At the end of a transmission, for example when the transmitter is out of new data for transmission, there may be a method to ensure that the last few bits have been successfully received. For example, the UE may transmit a timeout NACK when it has failed to decode the last few bits a set time after a first transmission. In another example, the UE polls responses from the transmitter to send the current state.

For low latency traffic, a transmitter may stop encoding the data with information from the first packet after a flush time. The flush time may be set to be at least the delay bound of the first packet. The flush time is used at the receiver to determine whether the information from the first packet is contained in the received data. In one example, the flush time may be an absolute amount of time, rather than the number of transmissions, which may vary based on scheduling and the traffic flow. The flush time may be expressed as the number of TTIs, or in another unit of time, such as units of milliseconds. Also, the flush time may be fixed or variable. The flush time information may the conveyed in a variety of manners. In an example, the flush time is sent on the control channel. In another example, the flush time is determined during traffic type setup between the UE and the network. In an additional example, the flush time is implicitly derived, for example based on traffic type. This information may be specified in a standard. Because of the low latency, only a few bits are required to signal the flush time. For example, three bits may signal up to eight units of time. Alternatively, one bit is transmitted to signal the receiver of the need to flush the first packet.

Figure 10:
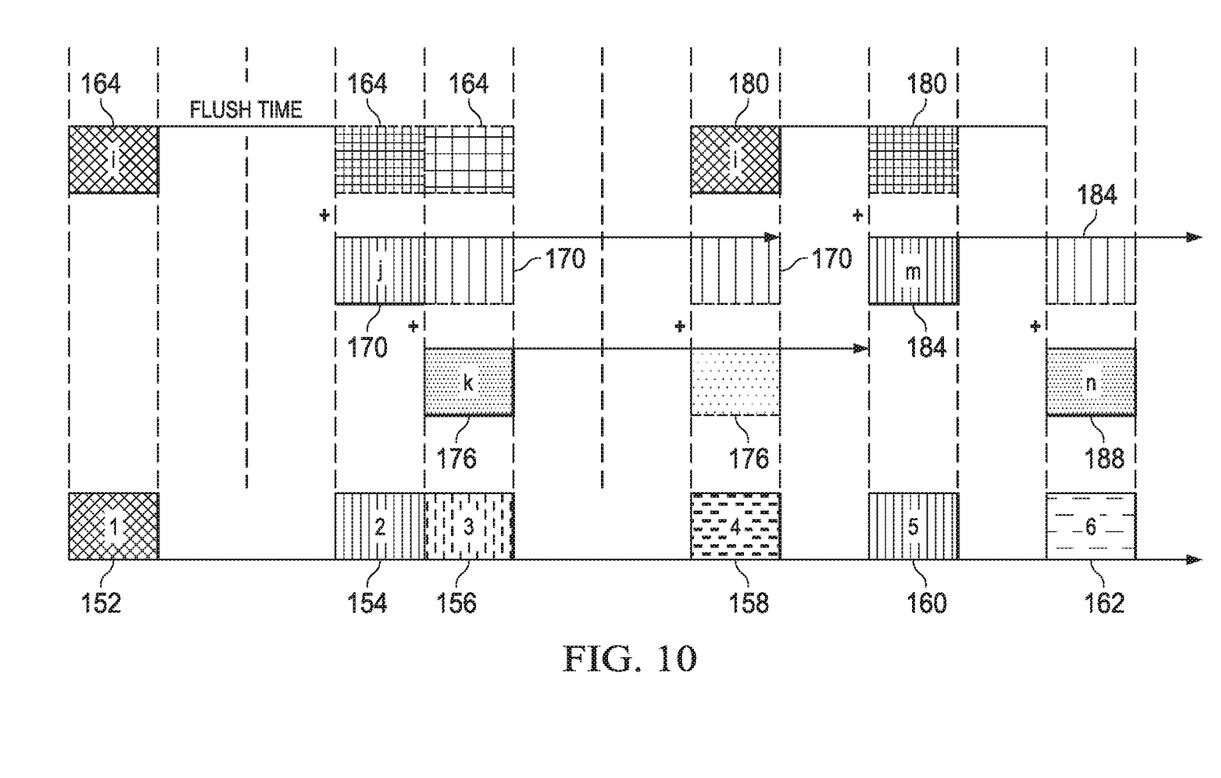
FIG. 10 illustrates embodiment flush times.

FIG. 10 illustrates transmissions with a flush time of 4 TTIs. Transmission 164 occurs in timeslot 152. In timeslot 154, transmission 164 is decoded, and transmission 170 occurs. Then, in timeslot 156, transmissions 164 and 170 are read, and transmission 176 is made. After timeslot 156, transmission 164 will no longer be available. In timeslot 158, transmission 180 is made, and transmissions 170 and 176 are decoded. After timeslot 158, transmission 170 will no longer be available for decoding. In timeslot 160, transmission 176 is no longer available for decoding, transmission 180 is decoded, and transmission 184 is made. Also, in timeslot 162, transmission 180 is no longer available for decoding, transmission 184 is decoded, and transmission 188 is made.

Figure 11:
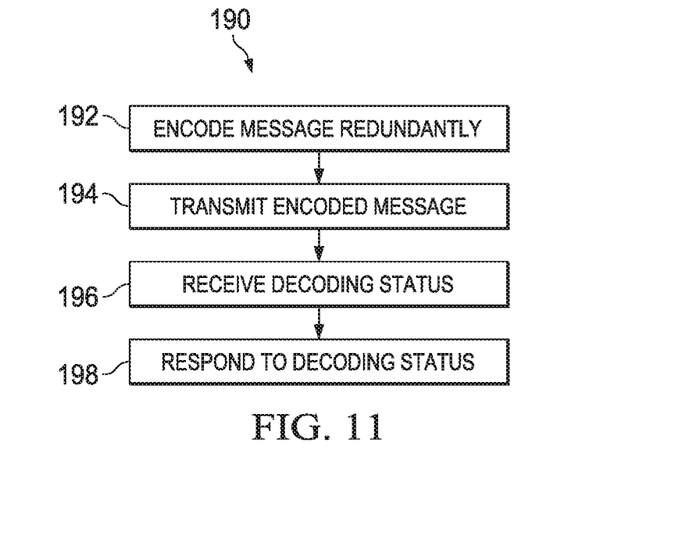
FIG. 11 illustrates a flowchart for an embodiment method of FEC performed by a transmitter.

FIG. 11 illustrates flowchart 190 an embodiment method of FEC performed by a transmitter. The transmitter may be a UE or a communications controller. Initially, in step 192, the transmitter redundantly encodes the message using a FEC technique. The FEC technique may be convolution coding, block coding, concatenation coding, turbo coding, fountain coding, LDPC coding, or another coding type, such as polar coding. In one example, information bits are mixed into subsequent transmissions, to be used to recover from a loss. The FEC code may span multiple TTIs. An embodiment FEC has a block upper triangular parity check matrix, where the blocks correspond to different scheduling instances. The FEC may be separate from the resource assignment, in that a resource assignment may not be directly tied to a FEC code and vice versa. For example, one FEC may span several resource assignments. An FEC code may be spread over multiple TTIs. The FEC code may be spread over multiple transmissions of the same user, or over data from multiple users. In an example, some or all of the parity bits are interleaved for a combined packet stream with more than one packet streams. In one example, the interleaver matrix for the first data stream is block diagonal, and the parity bits of the second part of the stream or punctured with parity bits from the first packet. The transmitter may stop encoding the data with information from the first packet after a flush time. The flush time may be fixed or variable. The flush time may be sent on a control channel, predetermined, determined during traffic type setup, or implicitly derived, for example based on traffic.

Next, in step 194, the transmitter transmits the encoded message to a receiver. The transmitted message may include a QAM field, a reference decoding position, the stream being use, a mother code configuration, a counter indicating a control channel, or a TTI.

Then, in step 196, the transmitter receives a message indicating the decoding status of the receiver. In one example, the response is an ACK or a NACK transmitted every TTI. In another example, the response is an ACK or NACK which is transmitted less often than every TTI, for example every ten TTIs. An ACK may indicate that there are no problems during the time interval, while a NACK indicates that there is a problem during the time interval. The NACK may indicate which message(s) have a problem.

In another example, the transmitter receives a NACK only when there is a problem requiring a retransmission.

In step 198, the transmitter responds to the decoding status message. For example, the transmitter retransmits the message indicated by a negative decoding status message. The transmitter may apply a MCS adaptation which reduces the effective transmission rate, to prevent future errors. In another example, the transmitter applies a short term decrease in the transmission rate to improve a particular error condition. In an additional example, the receiver requests additional parity bits to help recover.

Figure 12:
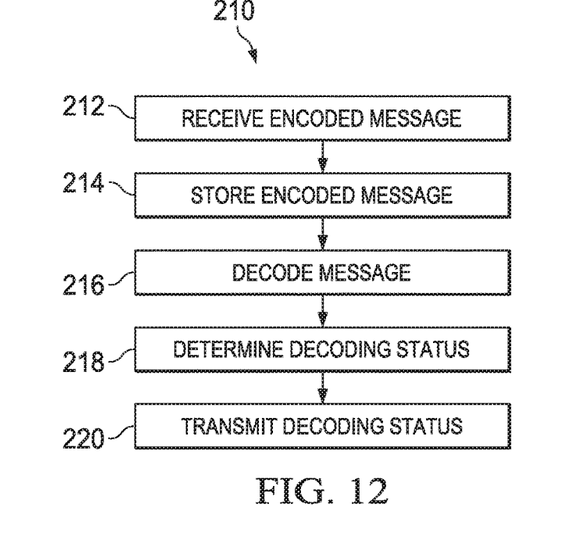
FIG. 12 illustrates a flowchart for an embodiment method of FEC performed by a receiver.

FIG. 12 illustrates flowchart 210 for an embodiment method of FEC performed by a receiver. Initially, in step 212, the receiver receives an FEC encoded message from a transmitter.

Next, in step 214, the receiver stores the received message. The message is stored so it can be decoded at a desired rate of decoding, and so it will be stored for decoding other frames. Information bits in later messages may be used to recover from a loss. In some examples, step 214 is not performed.

Then, in step 216, the receiver decodes the FEC encoded stored message. The encoding technique may be convolution coding, block coding, concatenation coding, turbo coding, fountain coding, LDPC coding, or another coding technique, such as polar coding. In one example soft decoding is used. Soft decoding is a class of algorithm used to decode data which has been encoded with an error correcting code. While in hard decoding, the data may take on a fixed set of values, for example 0 or 1 in a binary code, the inputs to a soft decoder may take on a range of values. Alternatively, hard decoding is used. An embodiment FEC has a block upper triangular parity check matrix, where the blocks correspond to different scheduling instances. In one example, the receiver knows the amount of data being transmitted, for example from a separately transmitted message. The amount of data may be utilized to know which bits are parity bits.

In step 218, the receiver determines a decoding status. The receiver may determine the decoding status of each TTI or for multiple TTIs.

In step 220, the receiver transmits the decoding status to the receiver. In one example, the receiver transmits a NACK or an ACK for every frame. In another example, the receiver only transmits a NACK when there is a decoding error. The NACK may contain information on the error. In an additional example, the receiver transmits a NACK or ACK for a period of time, indicating either that there were no errors in the period of time, or that there was one or more error in the period of time. A NACK may include information on the error, or just indicate the presence of the error. In one example, a NACK is transmitted only when the receiver cannot recover the data, for example when the parity bits no longer refer to a particular block of data. In another example, the receiver transmits a timeout NACK when it fails to decode the last few bits in a transmission after a period of time. In another example, the receiver polls responses from the transmitter on the current state of the transmitter.

Figure 13:
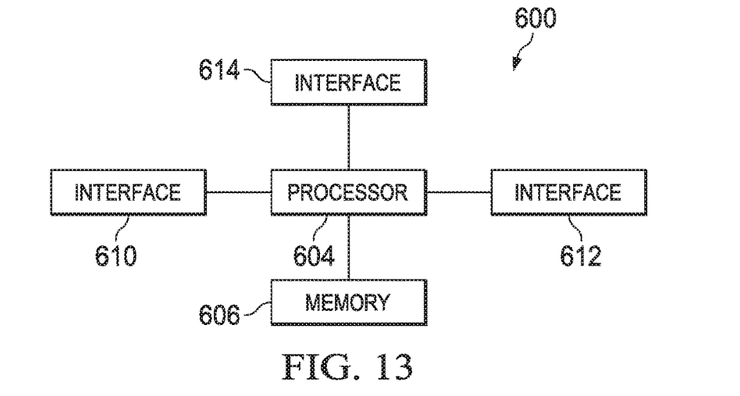
FIG. 13 illustrates a block diagram of an embodiment processing system.

FIG. 13 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 13. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 13, such as long term storage (e.g., nonvolatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
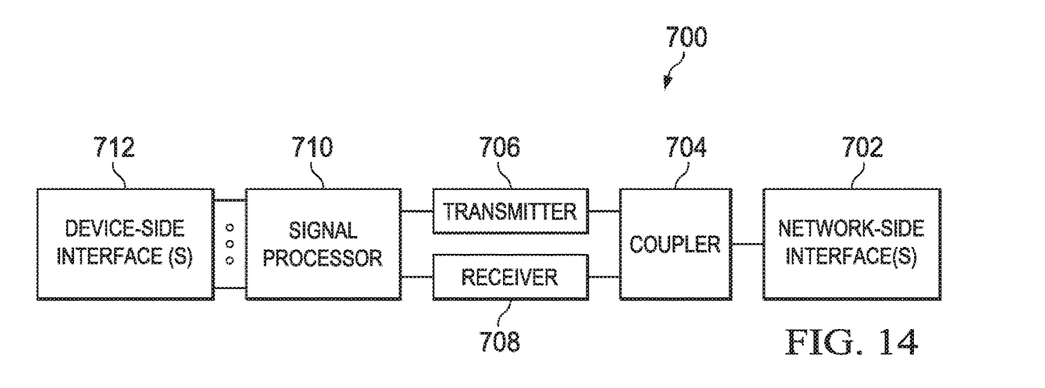
FIG. 14 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 14 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

An embodiment method includes receiving, by a first device from a second device, a plurality of encoded messages on a plurality of transmission time intervals (TTIs), where the plurality of encoded messages are forward error correction (FEC) encoded, and where the FEC spans the plurality of encoded messages and decoding the plurality of encoded messages using FEC. The method also includes determining a plurality of decoding status messages in accordance with decoding the plurality of encoded messages and transmitting, by the first device to the second device, the plurality of decoding status messages less often than once every TTI.

An embodiment method also includes storing the plurality of encoded messages before decoding the plurality of encoded messages. Another embodiment method includes receiving a message indicating a size of the plurality of encoded messages and decoding the plurality of encoding messages in accordance with the size of the plurality of encoded messages. In another embodiment method, transmitting the plurality of decoding status messages includes transmitting the plurality of decoding status messages periodically. In an additional embodiment, transmitting the plurality of decoding status messages includes transmitting a negative decoding status message when detecting an error in decoding the plurality of encoded messages. In another embodiment, the first device is a user equipment (UE) and the second device is a communications controller. In an additional embodiment, the first device is a communications controller and the second device is a UE. In an embodiment, the plurality of encoded messages is stream decodable.

An embodiment method includes forward error correction (FEC) encoding a plurality of messages to produce a first plurality of encoded messages, where the FEC spans the first plurality of encoded messages and transmitting, by a first device to a second device, the first plurality of encoded messages. The method also includes receiving, by the first device from the second device, a plurality of decoding status messages in accordance with the first plurality of encoded messages, where the plurality of decoding status messages is received less often than once every TTI.

In an embodiment, FEC encoding the plurality of messages further includes using a block upper triangular parity check matrix, where blocks of the block upper triangular parity check matrix correspond to transmission time intervals (TTIs). An embodiment also includes transmitting a second plurality of encoded messages in accordance with a decoding status message of the plurality of decoding status messages. An additional embodiment includes adjusting a modulation and coding scheme (MCS) in accordance with a decoding status message of plurality of decoding status messages. Another embodiment includes adjusting a data rate in accordance with the plurality of decoding status messages. In another embodiment, encoding the plurality of messages includes turbo encoding, low density parity-check (LDPC) encoding, polar encoding, or fountain encoding the plurality of messages. In an additional embodiment, the first plurality of encoded messages is stream decodable.

An embodiment also includes interleaving parity bits of a first data stream and a second data stream including using a first parity matrix on the first data stream and using a second parity matrix on the second data stream to produce the plurality of messages. In one example, the first parity matrix is block diagonal and the second parity matrix punctures the second data stream with parity bits from the first data stream.

In another embodiment, forward error correction (FEC) encoding the plurality of messages includes encoding data with information from a first packet for a flush time. In an additional embodiment, the first device is a user equipment (UE) and the second device is a communications controller. In another embodiment, the first device is a communications controller and the second device is a UE.

An embodiment first device includes a processor and a non-transitory computer readable storage medium storing programming for execution by the processor. The programming includes instructions to receive, from a second device, a plurality of encoded messages on a plurality of transmission time intervals (TTIs), where the plurality of encoded messages are forward error correction (FEC) encoded, and where the FEC spans the plurality of encoded messages and decode the plurality of encoded messages using FEC. The programming also includes instructions to determine a plurality of decoding status messages in accordance with decoding the plurality of encoded messages and transmit, to the second device, the plurality of decoding status messages less often than once every TTI.

An embodiment first device includes a processor and a non-transitory computer readable storage medium storing programming for execution by the processor. The programming includes instructions forward error correction (FEC) encode a plurality of messages to produce a plurality of encoded messages, where the FEC spans the plurality of encoded messages and transmit, to a second device, the plurality of encoded messages. The programming also includes instructions to receive, from the second device, a plurality of decoding status messages in accordance with the plurality of encoded messages, where the plurality of decoding status messages is received less often than once every TTI.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving, by a first device from a second device, a plurality of encoded messages, the plurality of encoded messages being forward error correction (FEC) encoded interleaving parity bits with information bits, the parity bits being functions of older information or older parity bits, and the FEC encoding spanning the plurality of encoded messages;
   decoding the plurality of encoded messages using FEC;
   generating a plurality of decoding status messages in accordance with decoding the plurality of encoded messages; and
   transmitting, by the first device to the second device, the plurality of decoding status messages.

2. The method of claim 1, wherein:
   the receiving comprises receiving the plurality of encoded messages on a plurality of transmission time intervals (TTIs); and
   the transmitting comprises transmitting the plurality of decoding status messages less often than once every ITT.

3. The method of claim 1, further comprising storing the plurality of encoded messages before decoding the plurality of encoded messages.

4. The method of claim 1, further comprising:
   receiving a message indicating a size of the plurality of encoded messages; and
   decoding the plurality of encoding messages in accordance with the size of the plurality of encoded messages.

5. The method of claim 1, wherein transmitting the plurality of decoding status messages comprises transmitting the plurality of decoding status messages periodically.

6. The method of claim 1, wherein transmitting the plurality of decoding status messages comprises transmitting a negative decoding status message when detecting an error in decoding the plurality of encoded messages.

7. The method of claim 1, wherein the plurality of encoded messages is stream decodable.

8. A method comprising:
   forward error correction (FEC) encoding a plurality of messages to produce a first plurality of encoded messages, the FEC encoding interleaving parity bits with information bits, the parity bits being functions of older information or older parity bits, and the FEC encoding spanning the first plurality of encoded messages;
   transmitting, by a first device to a second device, the first plurality of encoded messages; and
   receiving, by the first device from the second device, a plurality of decoding status messages in accordance with a decoding status of the first plurality of encoded messages.

9. The method of claim 8, wherein the receiving comprises receiving the plurality of decoding status messages on only a subset of transmission time intervals (TTIs).

10. The method of claim 8, wherein the FEC encoding the plurality of messages comprises using a block upper triangular parity check matrix, wherein blocks of the block upper triangular parity check matrix correspond to TTIs.

11. The method of claim 8, further comprising transmitting a second plurality of encoded messages in accordance with a decoding status message of the plurality of decoding status messages.

12. The method of claim 8, further comprising adjusting a modulation and coding scheme (MCS) in accordance with a decoding status message of the plurality of decoding status messages.

13. The method of claim 8, further comprising adjusting a data rate in accordance with the plurality of decoding status messages.

14. The method of claim 8, wherein the FEC encoding the plurality of messages comprises turbo encoding, low density parity-check (LDPC) encoding, polar encoding, or fountain encoding the plurality of messages.

15. The method of claim 8, wherein the first plurality of encoded messages is stream decodable.

16. The method of claim 8, further comprising interleaving parity bits of a first data stream and a second data stream, the interleaving comprising using a first parity matrix on the first data stream and using a second parity matrix on the second data stream to produce the plurality of messages.

17. The method of claim 16, wherein the first parity matrix is block diagonal and the second parity matrix punctures the second data stream with parity bits from the first data stream.

18. The method of claim 8, wherein the forward error correction (FEC) encoding the plurality of messages comprises encoding data with information from a first packet for a flush time.

19. A first device comprising:
   a non-transitory memory storage comprising instructions; and
   one or more processors in communication with the memory storage, wherein the one or more processors execute the instructions to:
      receive, from a second device, a plurality of encoded messages on a plurality of transmission time intervals (TTIs), wherein the plurality of encoded messages are forward error correction (FEC) encoded, and wherein the FEC spans the plurality of encoded messages,
      decode the plurality of encoded messages using FEC,
      determine a plurality of decoding status messages in accordance with decoding the plurality of encoded messages, and
      transmit, to the second device, the plurality of decoding status messages less often than once every ITT.

20. The first device of claim 19, wherein the first device is a user equipment (UE) and the second device is a communications controller.

21. The first device of claim 19, wherein the first device is a communications controller and the second device is a UE.

22. A first device comprising:
   a non-transitory memory storage comprising instructions; and
   one or more processors in communication with the memory storage, wherein the one or more processors execute the instructions to:

forward error correction (FEC) encode a plurality of messages to produce a plurality of encoded messages, wherein the FEC spans the plurality of encoded messages, transmit, to a second device, the plurality of encoded messages, and receive, from the second device, a plurality of decoding status messages in accordance with the plurality of encoded messages, wherein the plurality of decoding status messages is received less often than once every TTI.

23. The first device of claim 22, wherein the first device is a user equipment (UE) and the second device is a communications controller.

24. The first device of claim 22, wherein the first device is a communications controller and the second device is a UE.

* * * * *

UNITED STATES PATENT AND TRADEMARK OFFICE
CERTIFICATE OF CORRECTION

| | |
|---|---|
| PATENT NO. | : 10,601,545 B2 |
| APPLICATION NO. | : 15/890746 |
| DATED | : March 24, 2020 |
| INVENTOR(S) | : Callard et al. |

Page 1 of 1

It is certified that error appears in the above-identified patent and that said Letters Patent is hereby corrected as shown below:

In the Claims

In Column 15, Line 36, Claim 2, delete "ITT" and insert --TTI--.

In Column 16, Line 55, Claim 19, delete "ITT" and insert --TTI--.

Signed and Sealed this
Eleventh Day of August, 2020

Andrei Iancu
*Director of the United States Patent and Trademark Office*